J. HOLLINGSWORTH.
Middlings Purifiers.

No. 143,346. Patented September 30, 1873.

Witnesses:
Chas. C. Wilson
Edmund Masson

Inventor:
John Hollingsworth
By Atty. A. B. Stoughton

UNITED STATES PATENT OFFICE.

JEHU HOLLINGSWORTH, OF NEW YORK, N. Y.

IMPROVEMENT IN MIDDLINGS-PURIFIERS.

Specification forming part of Letters Patent No. 143,346, dated September 30, 1873; application filed August 7, 1873.

*To all whom it may concern:*

Be it known that I, JEHU HOLLINGSWORTH, of the city, county, and State of New York, have invented certain new and useful Improvements in Middlings-Purifiers; and that the following is a full, clear, and exact description of the same, reference being had to the accompanying drawings making a part of this specification, in which—

Figure 1:
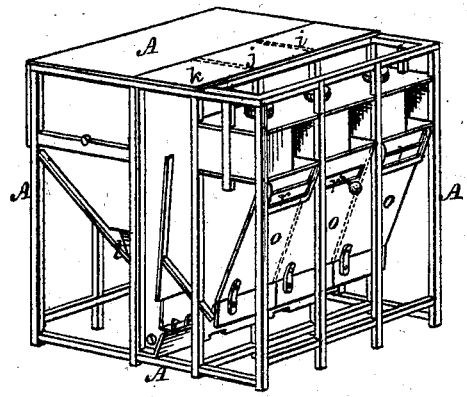
Figure 2:
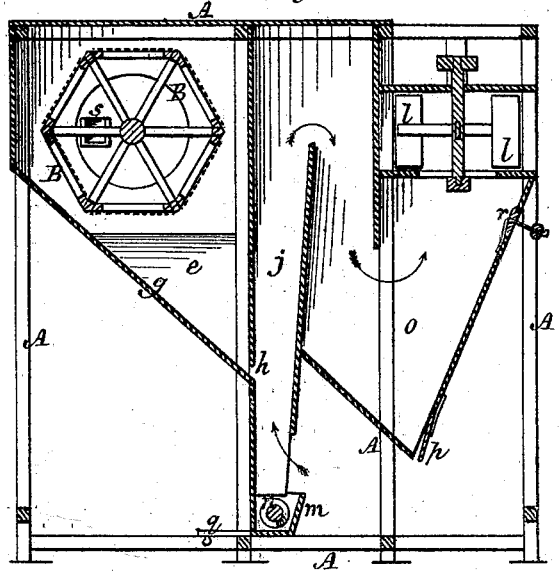
Figure 4:
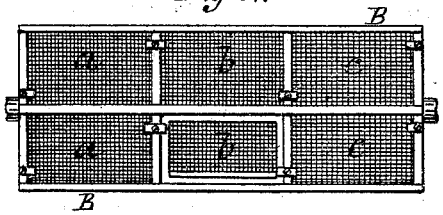
Figure 3:
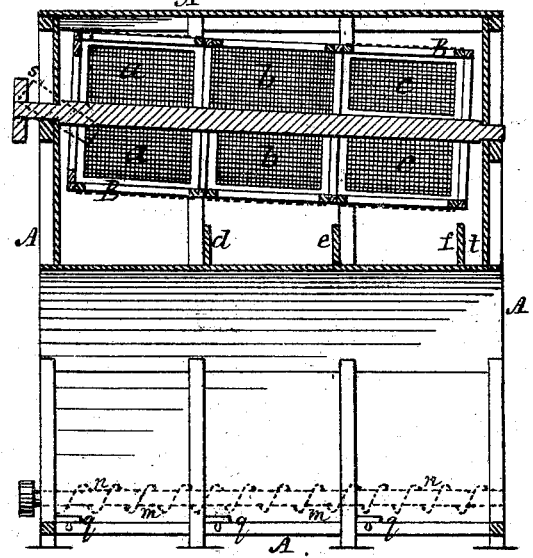

Figure 1 represents a perspective view of the machine. Fig. 2 represents a vertical longitudinal section thereof. Fig. 3 represents a transverse vertical section, and Fig. 4 represents an elevation, of the bolting-reel.

Similar letters of reference, where they occur in the several separate figures, denote like parts of the machine in all of the drawings.

My invention relates to an apparatus for purifying middlings as they fall or are sifted through the cloth on the middlings-separator, or as they fall from a reel, by means of a current of air that is forced across or through them during their transit or descent into the conveyer, and all along the entire length of the reel; and my invention consists in two or more fans, operating separately, and separated by partitions in the hopper under the reel, combined and operating to separate middlings bolted through a reel covered with cloth of different numbers of fineness, so as to create different intensities of draft or current of air, and thus purify the different qualities of middlings as they are sifted through the different numbers of cloth of the reel.

To enable others skilled in the art to make and use my invention, I will proceed to describe the same with reference to the drawings.

In a suitable frame or outside casing, A, and near the top, and at one end or side thereof, is hung a revolving reel or separator, B, which is shown as being six-sided, said sides being composed each of three sections, made in panels or frames, as at *a b c*, which can be removed from and attached to the frame of the reel, as may be desired. Over or in these frames is placed the bolting cloths or screens, the finer-meshed one at *a*, the next finer one at *b*, and the coarser one at *c*, so as to make three grades of separation in the length of the reel or bolting-cylinder. Underneath the reel or separator B, and across the chamber in which it works, are placed three partitions, *d e f*, at such distance apart as to correspond with the three graduated sections *a b c* of the reel, and so that the material which passes through the different gradients of the reel shall drop into a certain space and remain separate from that which passes through the other portions of the reel. The separated material, as it drops from the reel into its separated divisions or partitions, falls upon an inclined guiding-board, *g*, and is thence directed to the openings *h* of the separate chambers, whence it passes into air trunks or passages *i j k*, through which blasts or currents of air are drawn by fans *l*, which are graduated or regulated for the particular qualities, sizes, or specific gravities of the different separated material that they are to act upon. As the grades of separated material fall into their respective air trunks or passages, the heavier portions of the material, which make the middlings, fall into the trough *m*, and are carried out, to be reground, by the conveyer *n*. The lighter portion passes up over the division-board, as shown by the arrows at Fig. 2, into chambers *o*, and the very lightest, which is the bran or hull of the grain, is carried out by the fans, and the heavier of this light material drops down to the bottom of the chambers *o*, and is taken out through openings controlled by doors or slides at *p*.

The trough *m* may have openings in its bottom controlled by slides *q*, so that the different grades of material which make the middlings may be kept separate, and taken out at these several openings; or, by closing said slides, cause all the middlings material to pass out at one end of said trough.

The fans *l*, of which there are three shown, being one for each division or gradient of the separator, may be all driven by one belt or band, and the blast of each one regulated by valves or openings *r*, so as to allow the air that supplies the fan to come partially through said openings, and partially through the air trunks or passages; or the blast of each fan may be regulated by the speed with which they are driven.

The middlings material and the bran mixed therewith is fed into the reel or separator at *s*, Fig. 3, and is first acted upon by the finer cloth *a*, which takes out the finer or smaller particles, and the blast or fan that receives this first separation is regulated for particles of their specific gravity or size. The material then passes onto the next larger-meshed cloth, where another separation takes place of larger-sized particles, or those of greater specific gravity, and the fan or blast working in connection with this second separation is regulated to drop the heavier, and carry over and out the lighter, portions of this division of the material. The material then passes over the third and coarser section of the reel, where a third separation takes place of still larger and heavier particles, and the fan that works in connection with this separation is regulated to drop the heavier and carry out the lighter stuff. What remains in the reel passes out at the end thereof, and out of the case or machine at the opening at *t*, Fig. 1.

By the use of separate blasts, adapted and regulated to the several separations into sizes, much of the middlings material is saved which otherwise would pass over and out of the machine, if the blast were uniform and strong enough to carry the heavier and larger particles of bran out. The series of graduated screens or bolting-cloths, with the series of partitions or divisions, and the separately-regulated currents or blasts, keep separate the several sizes of the material to be acted upon, not allowing them to mingle, nor to overload the reel, and a complete separation takes place as fast as the grades of material drop from the bolt or reel.

I have described and shown three distinct and separate gradations of division of the material, according to their size or specific gravities. Two may be used to advantage, and four or more divisions of separation may be made; or, what would amount to substantially the same thing, two machines, such as I have shown, might be used, the material to be acted upon passing by gradations and regulations of blast through both.

The bolting cloth or screens attached to the interchangeable frames or panels may be fitted on the outside or the inside of said panels, as may be preferred by the user.

Having thus fully described my invention, what I claim as new, and desire to secure by Letters Patent, is—

The combination of two or more grades of bolting-cloth on a reel with two or more fans regulated as to blast with regard to said cloth and two or more separate chambers or passages communicating between the bolt and the fans, for the purpose of separating middling material from bran, &c., as described and represented.

JEHU HOLLINGSWORTH.

Witnesses:
 ADAM GOS,
 CHAS. W. WICKHAM.